Figures 1, 2, 3:
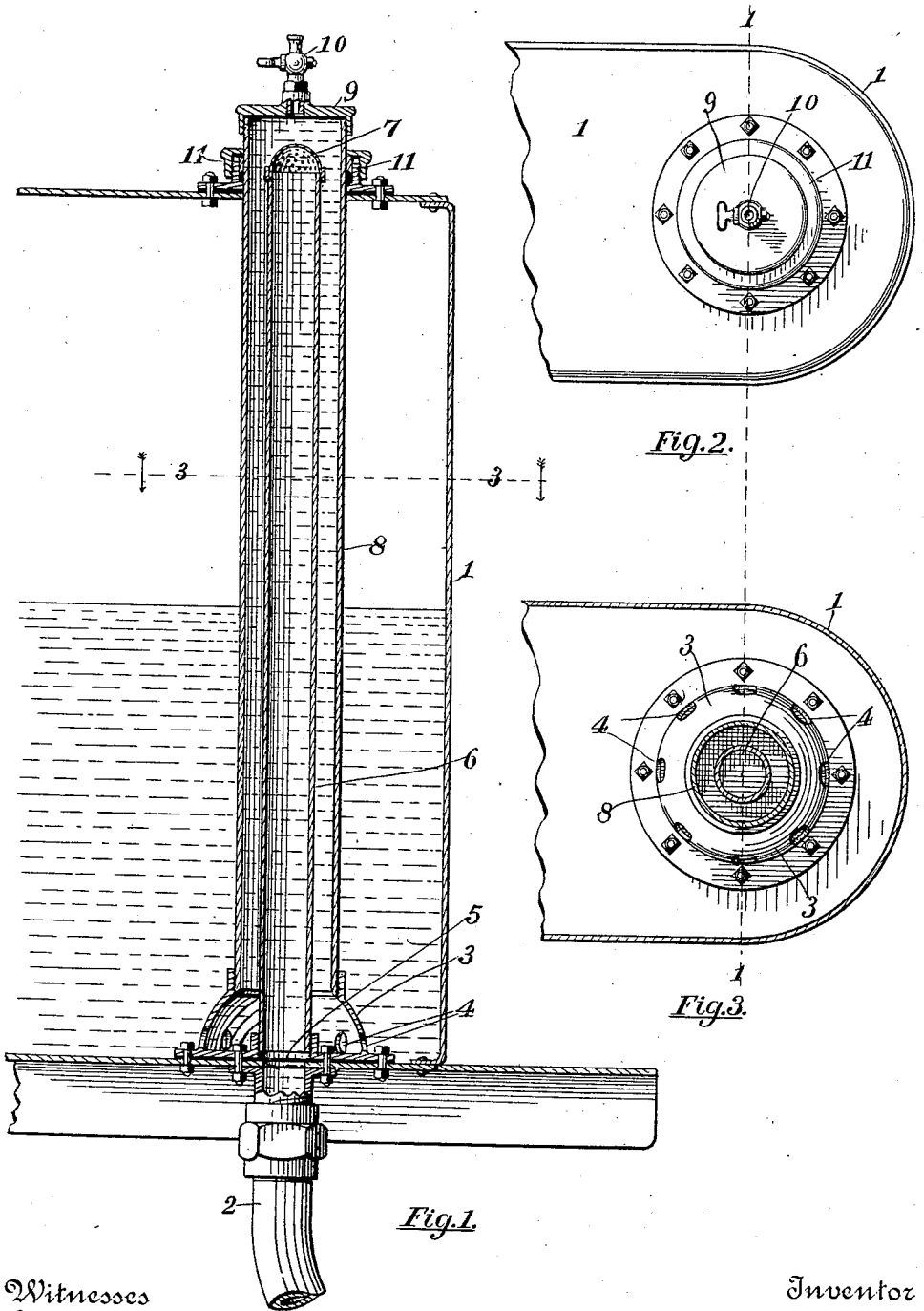

No. 869,854. PATENTED OCT. 29, 1907.
C. W. LA RUE.
TANK SIPHON FOR LOCOMOTIVES.
APPLICATION FILED DEC. 26, 1906.

Witnesses
Georgiana Chace
Palmer A. Jones

Inventor
Charles W. La Rue
By Luther V. Moulton
Attorney

UNITED STATES PATENT OFFICE.

CHARLES W. LA RUE, OF GRAND RAPIDS, MICHIGAN, ASSIGNOR OF ONE-FIFTH TO FRED H. LA RUE, ONE-FIFTH TO FRANK J. LA RUE, AND ONE-FIFTH TO ALICE P. LA RUE, OF GRAND RAPIDS, MICHIGAN, AND ONE-FIFTH TO WILLIAM L. WILCOX, OF LEROY, MICHIGAN.

TANK-SIPHON FOR LOCOMOTIVES.

No. 869,854.      Specification of Letters Patent.      Patented Oct. 29, 1907.

Application filed December 26, 1906. Serial No. 349,572.

*To all whom it may concern:*

Be it known that I, CHARLES W. LA RUE, a citizen of the United States of America, residing at Grand Rapids, in the county of Kent and State of Michigan, have invented certain new and useful Improvements in Tank-Siphons for Locomotives; and I do hereby declare the following to be a full, clear, and exact description of the invention, such as will enable others skilled in the art to which it appertains to make and use the same.

My invention relates to improvements in tank siphons for locomotives; and its object is to prevent clogging of the injectors by sediment from the water tank, to provide for shutting off the water in case of accident, and to provide the device with various new and useful features hereinafter more fully described and particularly pointed out in the claims, reference being had to the accompanying drawings, in which:

Figure 1. is a vertical section of a device embodying my invention taken on the line 1—1 of Figs. 2. and 3.; Fig. 2. is a plan view of the same; and. Fig. 3. a horizontal section on the line 3—3 of Fig. 1.

Like numbers refer to like parts in all of the figures.

My invention consists essentially of a siphon-like structure in the water tank of a locomotive and connected to the pipe or hose extending to the engine, a strainer in the upper part of the structure, and means for admitting air to the device, as will more fully appear by reference to the drawings, in which:

1 represents a portion of the water tank of a locomotive; 2 the pipe or hose connecting the same with the injector of the engine and opening into the bottom of the tank; 3 is a hollow dome-shaped casting secured to the bottom of the tank over the opening to the pipe 2. This dome is provided with a series of inlet openings 4 near its base, and a central bottom opening 5 connecting with the interior of the pipe or hose 2.

6 is a pipe connected at the bottom to the hose 2 and extending upward from the opening 5 to near the top of the tank. This pipe is provided at its upper end with a screen 7 to prevent the entrance of solid particles of any considerable size, that may be in the water; 8 is a larger pipe surrounding the pipe 6 and spaced apart therefrom to form an upward passage for the water. This pipe opens into the top of the dome 3 at the bottom and extends above the upper end of the pipe 6 at the top. The upper end of this pipe 8 also extends through the top of the tank; is surrounded by a gland 11 to prevent water from escaping around the same; and is closed at the top by a cap 9 in which cap is inserted an air cock 10.

In operation, the air being withdrawn from within the pipes 6 and 8, the water flows upward between the pipe 8 and the pipe 6, and thence through the screen 7 and down inside the pipe 6 into the hose 2 and thence to the injector of the engine. In its upward passage any heavy sediment in the water will fail to rise between the pipe 8 and the pipe 6 and any other solid particles light enough to rise with the current of water will be stopped by the screen 7. In the event that the screen 7 becomes clogged, it is easily cleared by blowing back through the hose 2 and pipe 6 by means of the injector, or the screen is easily removed, cleaned or repaired by removing the cap 9. In the event of accident, whereby the hose 2 is broken or uncoupled, the flow of water therethrough is immediately stopped by opening the air cock 10 and breaking the vacuum of the siphon.

By means of this device, I am able to effectually prevent clogging of the injector of a locomotive, which frequently occurs, and is a source of considerable inconvenience, requiring frequent disconnecting and cleaning out of the same. Also in cold weather, the hose 2 can be cleared of water instantly by blowing back through the same and thus left empty when the engine is out of use.

What I claim is—

1. In combination with a tank, and a hose opening into the bottom thereof; an inner pipe connected to the hose and extending upward within the tank, a strainer on the upper end of the said pipe, an outer pipe inclosing the inner pipe and the strainer and spaced apart therefrom, and means for admitting fluid to the lower end of the outer pipe.

2. In combination with a tank and a hose opening into the bottom of the tank, an inner pipe connected to the hose and extending upward within the tank, an outer pipe surrounding the inner pipe and spaced apart therefrom and also extending through the top of the tank and slidable therein, a gland on the top of the tank and surrounding the outer pipe, a cap on the outer pipe, an air cock in the cap and means for admitting fluid to the lower end of the outer pipe.

3. The combination of a tank, a hose opening into the bottom of the tank, a dome-shaped member on the bottom of the tank and having a bottom opening opposite the hose and lateral openings, an inner pipe connected through the bottom opening with the hose and extending upward in the tank, an outer pipe surrounding the inner pipe and spaced apart therefrom, said outer pipe being inserted in the top of the dome and opening into the same at the lower end, a cap closing the upper end of the outer pipe, and an air cock in the cap.

4. The combination of a tank, a hose opening into the bottom of the tank, a dome-shaped member having a bottom opening opposite the hose and lateral openings near its base, an inner pipe connected to the hose and extending upward therefrom, a strainer on the upper end of said pipe, an outer pipe surrounding the inner pipe and spaced apart therefrom and also attached to the top of the dome and opening into the same, a cap closing the top of the outer pipe, an air cock in the cap, and a gland on the top of the tank and surrounding the outer pipe.

In testimony whereof I affix my signature in presence of two witnesses.

CHARLES W. LA RUE.

Witnesses:
L. V. MOULTON,
GEORGIANA CHACE.